United States Patent
Mannby (10) Patent No.: US 12,450,934 B2
(45) Date of Patent: Oct. 21, 2025

(54) SYSTEMS AND METHODS FOR HANDWRITING RECOGNITION

(71) Applicant: Microsoft Technology Licensing, LLC, Redmond, WA (US)

(72) Inventor: Claes-Fredrik Urban Mannby, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 17/795,080

(22) PCT Filed: Jan. 27, 2021

(86) PCT No.: PCT/US2021/015312
§ 371 (c)(1),
(2) Date: Jul. 25, 2022

(87) PCT Pub. No.: WO2021/154871
PCT Pub. Date: Aug. 5, 2021

(65) Prior Publication Data
US 2022/0375244 A1    Nov. 24, 2022

(30) Foreign Application Priority Data
Jan. 27, 2020   (LU) ........................................ 101615

(51) Int. Cl.
*G06V 30/32*   (2022.01)
*G06F 40/279*   (2020.01)
(Continued)

(52) U.S. Cl.
CPC .......... *G06V 30/373* (2022.01); *G06F 40/279* (2020.01); *G06V 10/82* (2022.01);
(Continued)

(58) Field of Classification Search
CPC ...... G06V 30/373; G06V 10/82; G06V 30/24; G06V 30/268; G06V 30/32; G06F 40/279; G06F 18/24133
(Continued)

(56) References Cited

U.S. PATENT DOCUMENTS 5,970,170 A    10/1999   Kadashevich et al.
7,415,171 B2    8/2008   Snapp
(Continued)

FOREIGN PATENT DOCUMENTS

JP    6251195 B2    12/2017
WO    2017067652 A1    4/2017

OTHER PUBLICATIONS

Decision to Grant Article 97 (1) Received for European Application No. 21708093.6, mailed on Sep. 21, 2023, 02 pages.
(Continued)

*Primary Examiner* — Stephen P Coleman (57) ABSTRACT

Examples described herein generally relate to systems and methods for handwriting recognition. In an example, a computing device may receive input corresponding to a handwritten word and apply first recognition model to the input. The first recognition model may be configured to determine a first confidence level of a first portion of the input is greater than a second confidence level of a second portion of the input. The computing device may also apply a second recognition model to the input, wherein the second recognition model is different from the first recognition model and combine results of the first recognition model and the second recognition model to determine a list of candidate words. The computing device may also output one or more candidate words from the list of candidate words.

20 Claims, 4 Drawing Sheets

(51) Int. Cl.
 *G06V 10/82* (2022.01)
 *G06V 30/24* (2022.01)
 *G06V 30/262* (2022.01)

(52) U.S. Cl.
 CPC ............ *G06V 30/24* (2022.01); *G06V 30/268* (2022.01); *G06V 30/32* (2022.01)

(58) Field of Classification Search
 USPC ........................................................ 382/181
 See application file for complete search history.

(56) References Cited

U.S. PATENT DOCUMENTS

| | | | |
|---|---|---|---|
| 8,645,417 | B2 | 2/2014 | Groeneveld et al. |
| 2007/0286486 | A1 | 12/2007 | Goldstein |
| 2013/0156302 | A1* | 6/2013 | Rodriguez Serrano ..................... G06V 30/2276 382/159 |
| 2013/0188863 | A1 | 7/2013 | Linderman et al. |
| 2015/0356360 | A1 | 12/2015 | Wimmer et al. |
| 2018/0107650 | A1 | 4/2018 | Calvo et al. |

OTHER PUBLICATIONS

"Notice of Allowance Issued in European Patent Application No. 21708093.6", Mailed Date: Jul. 26, 2023, 7 Pages.

Graves, et al., "A Novel Connectionist System for Unconstrained Handwriting Recognition", In Journal of IEEE Transactions on Pattern Analysis and Machine Intelligence, vol. 31, Issue 5, May 2009, pp. 855-868.

Li, et al., "Assisting Fuzzy Offline Handwriting Recognition Using Recurrent Belief Propagation", In Proceedings of EEE Symposium Series on Computational Intelligence, Dec. 6, 2016, 8 Pages.

"Search Report and Written Opinion Issued in Luxembourg Patent Application No. LU101615", Mailed Date: Oct. 21, 2020, 10 Pages.

"International Search Report and Written Opinion Issued in PCT Application No. PCT/US21/015312", Mailed date: May 4, 2021, 16 Pages.

Yaeger, et al., "Combining Neural Networks and Context-Driven Search for Online, Printed Handwriting Recognition in the Newton", In Journal of AI Magazine, vol. 19, Issue 1, Mar. 15, 1998, pp. 73-89.

* cited by examiner

SYSTEMS AND METHODS FOR HANDWRITING RECOGNITION

CROSS-REFERENCE TO RELATED APPLICATION

This application is a National Stage Application of PCT/US2021/015312, filed on Jan. 27, 2021, which claims the benefit of Luxembourg Patent Application No. LU101615, entitled "SYSTEMS AND METHODS FOR HANDWRITING RECOGNITION" and filed on Jan. 27, 2022, which applications are incorporated herein by reference. To the extent appropriate, a claim of priority is made to each of the above disclosed applications.

BACKGROUND

The present disclosure relates to a computer system, and more particularly, to systems and methods for handwriting recognition and pattern classification.

Computer systems may provide handwriting recognition to interpret handwritten input from a source, such as a scanned document, a touchscreen, a stylus, or any other input source. Typically, handwritten words are identified by a computer system on a character-by-character basis, meaning, each individual character in a word is identified before the word is recognized. Character recognition may require the characters in the word to conform to standard character shapes in order for the computer system to recognize the characters. Some characters of a handwritten input, however, may not conform to the standard character shapes. In this case, the computer system may indicate to a user of the computer system that the writing is unrecognizable or require the user to select a correct word from a list of recommended words.

Typical computer systems have difficulty recognizing characters that do not conform to the standard character shapes due to sloppy handwriting. This may result in these computer systems recommending words that are not similar to the handwritten input. Further, in typical computer systems, it may be unclear why certain words are recommended to a user.

Thus, there is a need in the art for improvements in computer systems that provide handwriting recognition.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, a method of handwriting recognition includes receiving, by a processor, an input corresponding to a handwritten word having a plurality of characters. The method also includes applying, by the processor, a first recognition model to the input, the first recognition model configured to determine a first confidence level of a first portion of the input is greater than a second confidence level of a second portion of the input, the first confidence level and the second confidence level indicating a likelihood of the first portion of the input and the second portion of the input including recognizable characters. The method also includes applying, by the processor, a second recognition model to the input, wherein the second recognition model is different from the first recognition model. The method also includes combining, by the processor, results of the first recognition model and the second recognition model to determine a list of candidate words. The method also includes outputting, by the processor, one or more candidate words from the list of candidate words.

In another example, a computing device for handwriting recognition includes a memory storing instructions, and a processor communicatively coupled with the memory. In the computing device, the processor is configured to receive an input corresponding to a handwritten word having a plurality of characters. The processor is also configured to apply a first recognition model to the input, the first recognition model configured to determine a first confidence level of a first portion of the input is greater than a second confidence level of a second portion of the input, the first confidence level and the second confidence level indicating a likelihood of the first portion of the input and the second portion of the input including recognizable characters. The processor is also configured to apply a second recognition model to the input, wherein the second recognition model is different from the first recognition model. The processor is also configured to combine results of the first recognition model and the second recognition model to determine a list of candidate words. The processor is also configured to output one or more candidate words from the list of candidate words.

In another aspect, an example computer-readable medium storing instructions for performing the methods describe herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for handwriting recognition. The technical aspects include the ability of the systems and methods to improve handwriting recognition through the use of analyses using confidence levels, recognizers, and probabilistic analyses. In view of typical handwriting recognition systems, the technical aspects described herein may avoid the incorrect recognition.

In an example, the systems and methods are performed by a computing device configured to receive a handwriting input, recognize a word from the handwriting input, and output a candidate word based on the recognized word. The computing device may be any one of a tablet, smart phone, a personal computer, a laptop, a touchscreen, a head-mounted display device, a scanning device, or any other computing device. The handwriting input may correspond to text received from or input by, or otherwise associated with a scanned image, a digital pen, a stylus, or a finger or other body part.

In an aspect, the present disclosure describes systems and methods to identify which parts of handwritten text matter the most in being able to recognize the whole handwritten input. For example, a system may find the first two characters of a word and/or the last two characters of the word were written more clearly than the middle characters of the word. As such, those characters may be deemed to have a higher recognition confidence level or a higher character importance as compared to other parts of the handwritten input. Based on such a character importance determination, the system may determine one or more penalty measures for use in identifying candidate words that match the handwritten input.

In an aspect, the character importance determination may be implemented by identifying estimated confidence levels of characters based on estimated character positions of the text (e.g., a word). For example, the first two characters of the text, and the last two characters may be clear, however, remaining characters may be "fuzzy."

Further, the character importance determination may be implemented by classifying text (e.g., a word) into a number of categories, and applying different handwriting recognition algorithms or models to the handwritten input depending on the categories. For example, one recognizer model may be trained based on most letters being clear, another recognizer model may be trained based on the initial and final characters of the text being clear, and another recognizer model may be trained based on only the initial characters being clear. Use of multiple recognizer models may allow context to be applied to words or parts of words instead of focusing on individual character recognition results. In this example, context may mostly be a question of language model statistics, but other signals can be used as well, such as, but not limited to, the application being executed by the computing device, other parties in a conversation, or time of day.

In an aspect, the systems and methods disclosed herein may take into account strong signals, for example, by not accepting a word that does not match one or more recognized characters in the handwriting input. The systems and methods disclosed herein may also avoid taking discrepancies in an amorphous curvy or wiggle part of a word too seriously. The systems and methods disclosed herein may also balance combining the signal from recognized aspects of a word with contextual signals, such as, but not limited to, language model statistics, intended audience, application, or time of day, thereby allowing a thorough contextual search to be applied to the text in the right places, while holding strongly known aspects more constant.

Some handwriting recognition systems use a confidence level of text to be implicitly handled, for example, in the form of the internal workings of neural network models trained on partly "fuzzy" input. However, information implicit in such neural network models may tend to be lost by the time output candidate text are evaluated. For example, a handwriting recognition system may simply output a probability for each character for each portion of the input that it processes. The system may string the probabilities together using a Hidden Markoff Model and use the results of the model to determine most likely character sequences. The system may match the most likely character sequences to known words.

Some implementations of the present disclosure may provide a trail of how decisions for handwriting recognition is made, and may refer back to the identified features and their probabilities at any time during the analysis process. In an example, during analysis, the system of the present disclosure collects a set of features and accompanying probabilities, associated with ranges of the input, and, increasingly, as the analysis progresses, with ranges of the potential output. For example, the system may tag an initial portion of the handwriting input with a likelihood of 99% of being a capital letter, a likelihood of 97% of being a capital "R," and so on. The system may tag a range as a whole with a likelihood of 25% of being 9 characters long, 20% of being 8 characters long, etc. The system may tag a likelihood that the word ends with a character that has a descender with a likelihood of 90%. A logic system with heuristic weights, and/or a neural network that combines features may then be used by the system to arrive at aggregate probabilities given these features, and these probabilities may be adjusted over time, for a given user, based on the success or failure of previous outputs as judged by user acceptance. In an example, the system may learn that its determination of ascenders is not as accurate for the given user as for the general population, and may decrease the weight of such features in the future. By maintaining discrete records of each tentative determination regarding a feature made by the system, a final output by a user can then be compared with how well it matches each feature determination, and the weight and/or parameters (such as required height above the determined x-height for an ascender) of each feature detector may then be adjusted much more quickly than the typical number of samples needed to retrain a neural network model.

In an example, the system may also learn to equate a threshold level of probability for a feature to be a virtual certainty (e.g., ruling out potential candidate words if they are missing an identified ascender, if the resulting annoyance, distraction or decrease in efficiency of the user is deemed sufficient by a formula to determine the value or disvalue of presenting a candidate word). The system may apportion more "blame" to a feature violating a final output (e.g., an ascender that was identified but was not present in the final output) based on the identified probability of that feature. The system may also leverage known variability in parameters and probabilities based on analysis of large numbers of user's input, during offline training, or based on aggregate usage across many users in a "live" system. In other words, the system may learn to be more suspicious of some features relative to typical word recognition systems, and to adjust their weights and parameters more readily than typical word recognition systems.

Implementations of the present disclosure allows a user the option of being selectively sloppy when providing handwriting based on a desired input speed as well as an understanding of the likelihood that the system may be able to correctly interpret the input, for example, by distinguishing between unusual proper names and common terms. Alternatively or in addition, implementations of the present disclosure may provide for treatment of a sloppiness-identification as a separate recognition/classification action during handwriting recognition. Use of these implementations may allow faster text entry using handwriting and better handling of sloppy writing, and may also enable a computer system to apply strong penalties according to the implementations. For example, without such aspects of the present disclosure, typical computing systems may disregard strong signals, such as where a possible target word is identified, but the target word does not include initial characters that match recognized initial characters having a confidence level over a threshold that indicates a high confidence.

Turning now to the figures, examples of systems and methods for handwriting recognition by a computing device are depicted. It is to be understood that aspects of the figures may not be drawn to scale and are instead drawn for illustrative purposes.

Figure 1:
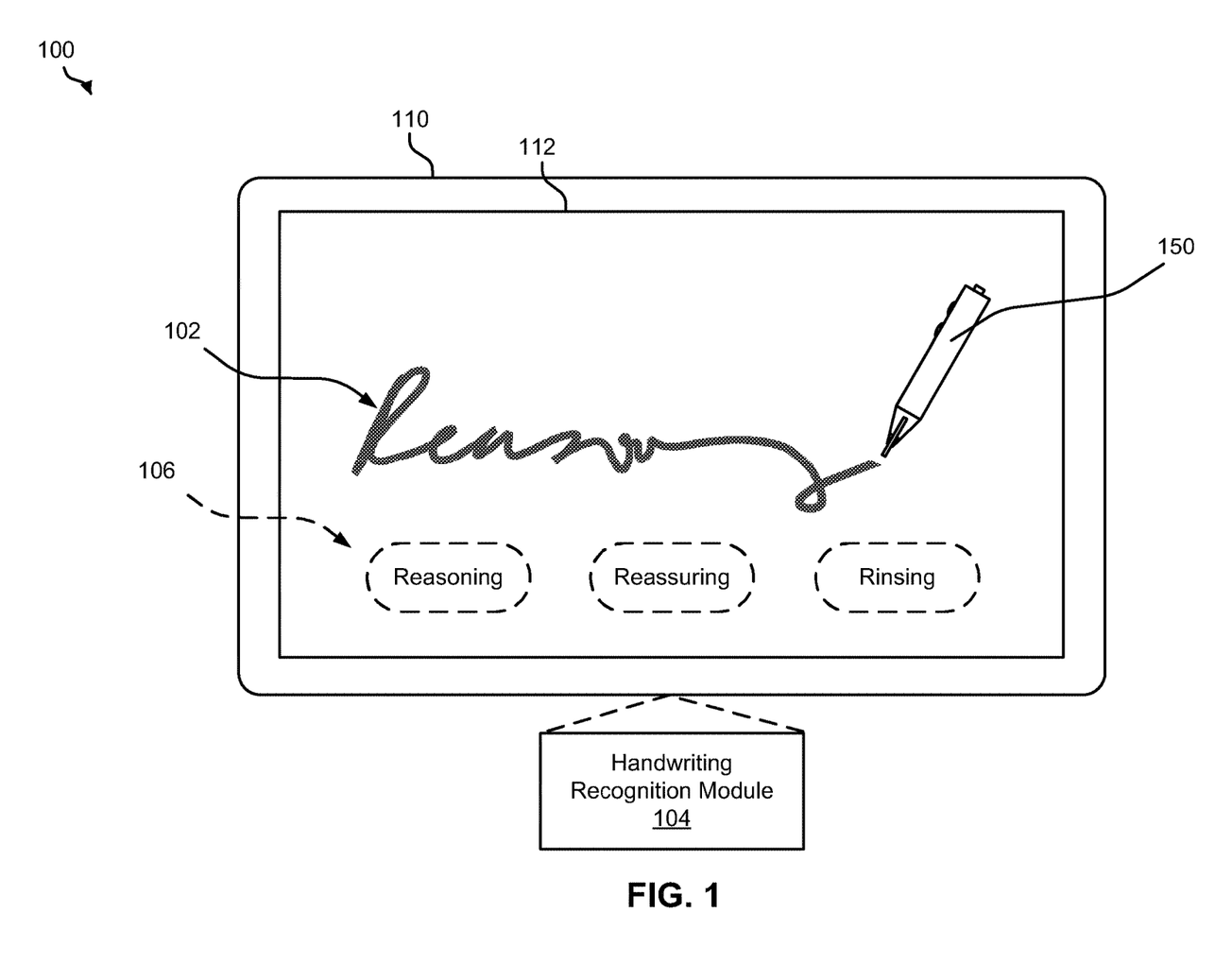
FIG. 1 is a diagram of an example computing device receiving handwritten input, according to aspects of the present disclosure.

Referring to FIG. 1, an example computing system 100 includes a computing device 110 having a handwriting recognition module 104 configured to analyze a handwriting input 102 (e.g., digital ink) from a handwriting input device, such as but not limited to a digital pen 150 (also referred to as a stylus or pencil), and output one more candidate words 106. Although illustrated as a presentation of the one or more candidate words 106, it should be understood that the output may alternatively or additionally include storing of the one or more candidate words 106 in a memory of the computing device 110.

The computing device 110 may be, for example, any mobile or fixed computing device including but not limited to a desktop, a laptop, a tablet computer, a cellular telephone, a gaming device, a mixed reality or virtual reality device (e.g., head-mounted display), a music device, a television, a navigation system, a camera, a personal digital assistant (PDA), a handheld device, any other computing device having wired and/or wireless connection capability with one or more other devices, or any other type of computerized device capable of receiving input corresponding to handwriting.

In an example implementation, the computing device 110 includes a display 112 having a digitized surface, such as a touch screen, that is configured to receive input from a user and output text, graphics, and/or images. The display 112 may include, for example, a digitizer or touch sensor for detecting a location of an interaction between a user and the display 112. For example, the digitizer may detect the location of a finger or the digital pen 150 on the display 112 or a point of contact or point of near contact between the digital pen 150 and the display 112. In some examples, the computing device 110 may detect the digital pen 150 hovering near the digitized surface and register a touch event upon such detection and/or upon an action such as clicking a button on the digital pen 150.

As illustrated in FIG. 1, the computing device 110 allows a user to draw handwriting input 102 (in this example, digital ink) on the display 112. For example, FIG. 1 illustrates the handwritten input 102 of the text "Reasoning" written on the display 112 in a continuous line. In a typical computing device, handwriting recognition software may attempt to recognize the text but may determine the text is unrecognizable due to sloppy writing, as one or more of the characters of the word are not recognized. However, systems and methods of the present disclosure provide techniques for recognizing sloppy handwriting and providing a determination trail indicating the reasoning for selecting the one or more candidate words 106 to associate with the handwriting input 102. For instance, in an non-limiting example, based on analyzing the handwriting input 102 as illustrated in FIG. 1, the handwriting recognition model 104 may generate and present one or more candidate words 106, including "Reasoning," "Reassuring," and "Rinsing." In this case of presenting the one or more candidate words 106, the computing device 110 may receive user input selecting a correct one of the one or more candidate words 106 that matches the handwriting input 102. The computing device 110 may then store the selected one of the one or more candidate words 106 in association with the handwriting input 102. Optionally, the handwriting recognition model 104 may utilize the selected one of the one or more candidate words 106 associated with the handwriting input 102 for training and/or for subsequent handwriting recognition analysis.

Figure 2:
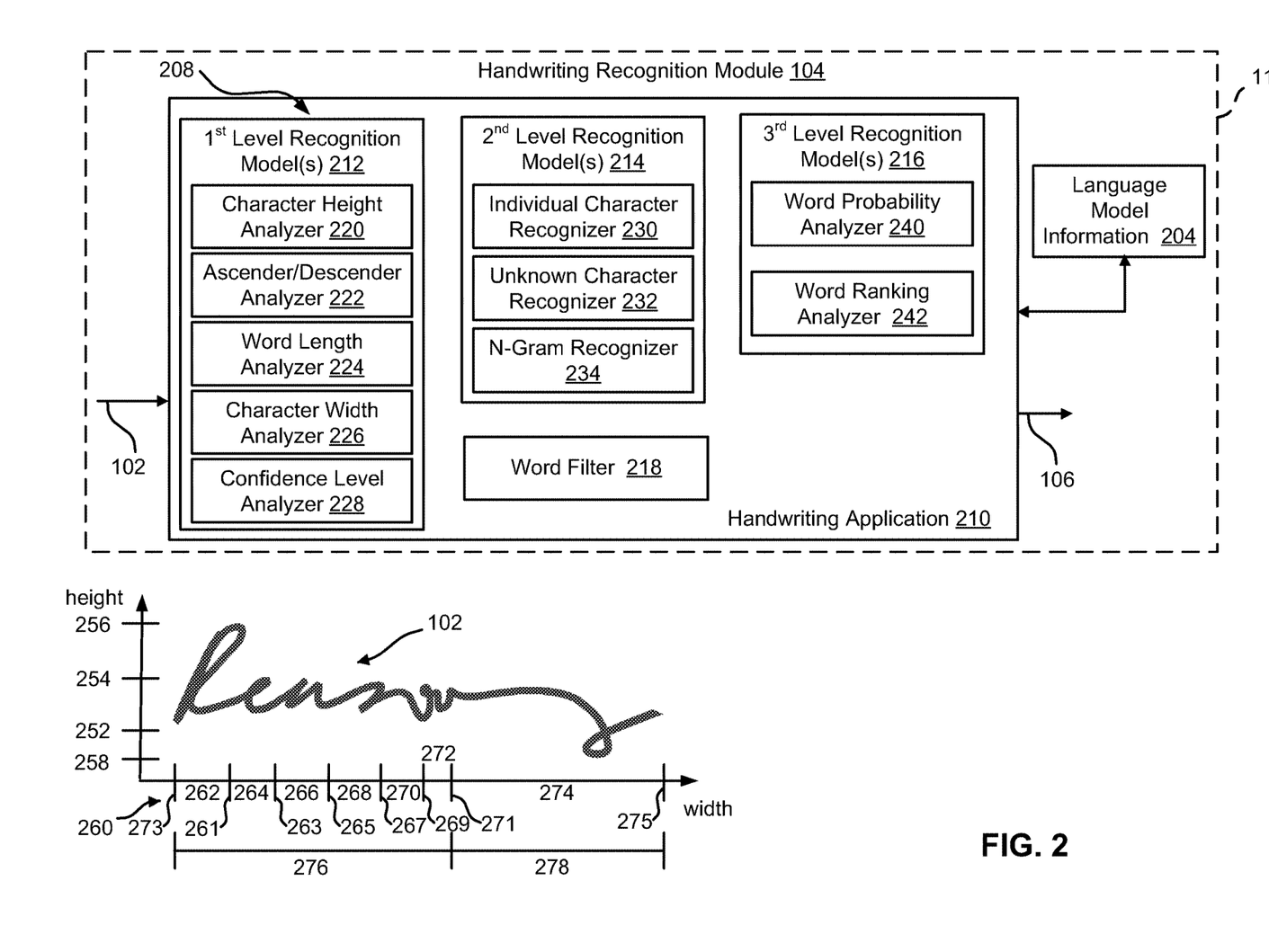
FIG. 2 is a block diagram of example aspects of the computing device of FIG. 1, including an optional graph of height unit versus width units used to analyze the handwritten input, according to aspects of the present disclosure.

Referring to FIG. 2, in an example of the handwriting recognition module 104 of the computing device 110, the handwriting recognition module 104 includes a handwriting application 210 configured to recognize handwriting (e.g., handwriting input 102) and output one or more candidate words 106. In an example, the handwriting application 210 uses language model information 204 including words, characters, writing samples, or any other word and language recognition information to recognize the handwriting input 102.

In an example, the handwriting application 210 includes a multi-level recognition model 208 configured to discern the handwriting input 102. Each level of the multi-level recognition model 208 may include or utilize one or more different recognition models to perform one or more analyses using one or more heuristics determiners, neural networks, and/or machine learning models as disclosed herein. Although the following examples include different models at different levels, it should be understood that any model or analyzer, or any combination of models or analyzers, may be used at any level, including the same model or analyzer being used at more than one level.

In a non-limiting example, the handwriting application 210 includes a first level recognition model(s) 212 to determine confidence levels of a number of portions of the handwriting input 102. The confidence levels may indicate a likelihood of characters or portions of the handwriting input 102 being recognizable. For example, the first level recognition model(s) 212 may be configured to determine a first confidence level of a first portion 276 of the handwriting input 102 and a second confidence level of a second portion 278 of the handwriting input 102. The first level recognition model(s) 212 may also determine the first confidence level is greater than the second confidence level, e.g., by comparing the values of the respective confidence levels, which indicates that the first portion 276 of the handwriting input 102 includes characters that are more recognizable than the second portion 278 of the handwriting input 102. As discussed herein, this may indicate that a user has written some letters (e.g., characters in first portion 276) clearly but written some letters (e.g., characters in second portion 278) sloppily. For example, as shown by the example handwriting input 102, many users tend to write a word using clear text at the initial portion of the word and become sloppy at the end portion of the word.

In an aspect, the first level recognition model(s) 212 determines the confidence levels based on a plurality of first analyses or first recognition models being implemented on the handwriting input 102. The plurality of first analyses may include one or more analyses that determine characteristics of the handwriting input 102 including characteristics of potential (predicted) characters of the handwriting input 102. In other words, during the first level recognition model(s) 212 may not attempt to identify the characters but identify characteristics of the handwritten input 102 for potential characters.

In an example, which may be used alone or with other examples, the first level recognition model(s) 212 includes a character height analyzer 220 configured to analyze, determine, and/or estimate a height of characters in the handwriting input 102. For example, the character height analyzer 220 may identify a baseline 252 from which to measure a height of different portions of the handwriting input 102. For instance, the character height analyzer 220 may analyze the initial letter of the handwriting input 102 to determine a height of the initial letter, which may indicate that the initial letter is a capital letter. As an example, the handwriting input 102 of "Reasoning" includes the capital "R" at the initial portion of the handwriting input 102, having a height 256, which is taller than remaining portions of the handwriting input 102, thereby indicating that the initial letter may be a capital letter.

In an alternative or additional example, the first level recognition model(s) 212 includes an ascender/descender analyzer 222 configured to analyze, determine, and/or estimate ascending and descending characteristics of the handwriting input 102. For example, the ascender/descender analyzer 222 may determine a base range of potential characters from the baseline 252 to the marker 254, which may indicate an average height corresponding to the handwriting input 102. The ascender/descender analyzer 222 may analyze the handwriting input 102 to identify characteristics that ascend above the marker 254 (e.g., characteristics of "R" that ascend to 256) and characteristics that descend below the baseline 252 (e.g., characteristics of "g" that descend to 258).

In an alternative or additional example, the first level recognition model(s) 212 also includes a word length analyzer 224 configured to analyze, determine, and/or estimate a number of potential characters or portions of the handwriting input 102. In an example, the word length analyzer 224 may determine cut points 260 (e.g., the vertical lines on the width axis) between characteristics of the handwriting input 102 and based thereon may determine an estimated number (or number range) of potential characters of the handwriting input 102. For example, the word length analyzer 224 may determine that a first intersection 261 exists between potential characters based on an extended line (e.g., line between the "R" and the "e") between looping characteristics of the handwriting input 102. Further, for example, the word length analyzer 224 may also determine a second through sixth cut points 263, 265, 267, 269, and 271 exist, with sixth intersection 271 being near the end of the handwriting input 102 (e.g., the line between the "n" and the "ing") based on the extended line before the descending characteristic at the end of the handwriting input 102. Consequently, in this example, the word length analyzer 224 may estimate that the handwriting input 102 includes 7 letters or characters, or some range of letters/characters that includes a value of 7.

In an alternative or additional example, the first level recognition model(s) 212 also includes a character width analyzer 226 configured to analyze, determine, and/or estimate widths of potential characters or portions of the handwriting input 102. For example, the character width analyzer 226 may measure a width of potential characters based on the initial text, determined cut points, and the end text. For example, the character width analyzer 226 may determine or estimate character widths, such as widths 262, 264, 266, 268, 270, 272, and 274 based on the beginning and end of the handwriting input 102 and the cut points 260. For instance, the character width analyzer 226 may determine or estimate the width 262 based on a distance between a starting point 273 of the initial text and the first intersection 261, the width 264 based on a distance between the first intersection 261 and the second intersection 263, and the width 274 based on a distance between the sixth intersection 271 and an ending point 275 of the handwriting input 102.

In an alternative or additional example, the first level recognition model(s) 212 also includes a confidence level analyzer 228 configured to analyze, determine, and/or estimate characteristics of the handwriting input 102 and determine one or more confidence levels of one or more portions of the handwriting input 102. In an example, a value of the confidence level may indicate a likelihood of one or more portions of the input having or matching recognizable characters. As such, a confidence level associated with a portion of the handwriting input 102 may be used to weight or bias the subsequent recognition analysis in order to force results that include words with characteristics that match one or more portions having the relatively higher confidence levels. For example, the confidence level analyzer 228 may analyze the handwriting input 102 and, based on the characteristics determined or estimated by the other analyzers (e.g., 220, 222, 224, 226), determine a first confidence level of a first portion 276 of the handwriting input 102 and a second confidence level of a second portion 278 of the handwriting input 102. For instance, the value of each of the first confidence level and the second confidence level may based on a number of cut points (e.g., 261, 263, 265, 267, or 269) in the first portion 276, the ascending/descending characteristics of the handwriting input 102, the number of potential characters, and/or the width of the potential characters matching with corresponding known parameters or known characteristics of known letters, known sets of letters, or known words from a letter characteristic, letter, or word list included in the language model information 204. In other words, portions of the handwriting input 102 that are more recognizable and that can be matched with a known letter characteristic, a known letter, known groups of letters, and/or known words will have a relatively higher confidence level than other portions of the handwriting input 102 that are less recognizable or that have less certainty of being a match with a known letter characteristic, a known letter, known groups of letters, and/or known words, Further, in this case, the confidence level analyzer 228 may determine that the value of the first confidence level of the first portion 276 is greater than the second confidence level of the second portion 278. In an example, the confidence level analyzer 228 may compare the characteristics to the language model information 204 to determine the confidence levels, and in this case may identify that characteristics of the first portion 276 as having a higher likelihood to match with known characteristics as compared to the characteristics of the second portion 278. As such, this result may be utilized by one or more remaining levels of the analysis so that the one or more candidate words 106 include words having characteristics that match the characteristics of the first portion 276.

In a non-limiting example, the handwriting application 210 includes one or more second level recognition model(s) 214 configured to determine characters of the handwriting input 102 and/or one or more candidate words that include such characters. In an example, the one or more second level recognition model(s) 214 may determine the characters based on the characteristics identified by the first level recognition model(s) 212.

In an example, which may be used alone or with other examples, the second level recognition model(s) 214 includes an individual character recognizer 230 configured to recognize individual characters of the handwriting input 102. In an example, the individual character recognizer 230 may analyze the characteristics determined by the first level recognition model(s) 212 to determine the individual characters. In an example, the individual character recognizer 230 may focus the analysis on the first portion 276 of the handwriting input 102 to determine the individual characters at each estimated character location (e.g., the respective widths) and/or candidate words including the individual characters at the estimated character location in the word.

In an alternative or additional example, the second level recognition model(s) 214 also includes an unknown character recognizer 232 configured to determine which characters of the handwriting input 102 are unrecognizable. In an example, the unknown character recognizer 232 may analyze the characteristics determined by the first level recognition model(s) 212 and determine one or more of the characters are unrecognizable based on the characteristics. Accordingly, the unknown character recognizer 232 may identify these characters by, for example, using a place marker or special characters at the corresponding estimated character locations to indicate that the character is unknown, and/or may generate candidate words having potential characters in the same estimated character locations.

In an example, the second level recognition model(s) 214 also includes an N-gram recognizer 234 configured to determine or estimate one or more N-grams of characters, where N is any integer greater than 1, preferably between 2-5, and more preferably 2 or 3. In other words, the term N-gram means a sequence of N contiguous characters. In an example, the N-gram recognizer 234 may analyze the characteristics determined by the first level recognition model(s) 212 and determine the second portion 278 of the handwriting input 102 includes an as-yet unknown N-gram. For example, the N-gram recognizer 234 may determine, based on the width of the second portion 278 in comparison with other potential character widths, that the second portion 278 includes more than one character. Further, the N-gram recognizer 234 may determine that the second portion 278 includes a "g" based on the descending characteristics of the end of the second portion 278. In view of these characteristics, the N-gram recognizer 234 may identify candidate words that include, for example, an N-gram of "ing."

In an example, the second level recognition model(s) 214 also includes an N-gram recognizer 234 that uses one or more neural networks (e.g., recurrent neural networks (RNNs) or convolutional neural networks (CNNs)) to recognize otherwise unclear portions of text as N-grams. The neural networks may be trained on training input (e.g., handwritten input 102) whose corresponding text is known (e.g., derived through human labeling or human prescribed input). In an example, during training of the neural network, the neural network may determine that a portion of training input is unclear, and determine which of the recognizable characters of the training input are missing from the recognized character portions. The neural network may be trained to map the portion of the training input to a portion of the known text, thus learning to recognize individual unrecognizable characters as well as N-grams (e.g., multi-character portions) of text. As an example of the training, the neural network may receive, as input, (a) a sample written text (e.g., "running" or "constitution") having common sequences of recognizable text (e.g., "runn" or "constitu") along with common N-grams (e.g., "ing" or "tion") that are unrecognizable or difficult to recognize (e.g., due to sloppy handwriting) and (b) a label identifying the written text (e.g., label of "running" or "constitution"). During training, the neural network may know that a regular character-based recognition can recognize the recognizable text (e.g., "runn" or "constitu") and, based on the label, the neural network may assume that the unrecognizable portion of the input between the recognized characters and the end of the word must be "ing" or "tion." The neural network may thereby train itself to map the unrecognizable portion to the N-gram (e.g., "ing" or "tion"). This process may be iterated a plurality of times using different words to train the neural network.

In other words, the first level recognition model(s) 212 and the second level recognition model(s) 214 operate to determine a set of characteristics that define the handwriting input 102, including but not limited to estimated word length, estimated characters and corresponding confidence levels, unrecognized characters, capital letters, non-capital letters, sets of sequences of characters, ascending characteristics, descending characteristics, etc. For instance, in the example of the handwriting input 102 of "Reasoning," the set of characteristics resulting from the first level recognition model(s) 212 and the second level recognition model(s) 214 may include but are not limited to: a 7 or 8 letter word, a capital letter at the beginning, the capital letter estimated to be an "R" with a relatively high likelihood, a second character estimated to be an "e" or an "i" with a lower likelihood than the "R," a third character estimated to be an "a" or an "n" with a lower likelihood than the "R," a fourth character estimated to be an "s" with a relatively high likelihood similar to the likelihood of the "R," an unrecognizable portion with a descender characteristic at the end, 4 or 6 characters in the middle without an ascender or descender characteristics, a potential N-gram with a descender at the end, a set of candidate words from one or more of the analyzers, etc. Thus, this set of characteristics may be used in a subsequent level of the analysis.

In another example, the second level recognition model(s) 214 may also determine the one or more candidate words are unknown words (e.g., words unknown to the language model information 204). For example, if the second level recognition model(s) 214 recognizes an unusual word, such as "penciling", the various analyses and recognizers described herein may construct a candidate word based on, for example, a likely "ing" N-gram ending, the "1" having an ascender, or any of the other characteristics determined by the first level recognition model(s) 212 and the second level recognition model(s) 214.

In a non-limiting example, the handwriting application 210 also includes a third level recognition model(s) 216 configured to determine or estimate a set of one or more candidate words 106, a probability of each candidate word, and rank the candidate words based on their respective probability. In an example, the third level recognition model(s) 216 may determine the one or more candidate words 106 based on a combination of the characteristics determined by the first level recognition model(s) 212 and the words determined by the second level recognition model(s) 214.

In an example, the third level recognition model(s) 216 includes a word probability analyzer 240 configured to analyze words based on results of the first level recognition model(s) 212 and the second level recognition model(s) 214, and determine the probability of a candidate word corresponding to the handwriting input 102. For example, the word probability analyzer 240 may identify candidate words from the language model information 204 that contain at least some amount of the same characteristics as those identified by the first level recognition model(s) 212 and the same characters identified by the second level recognition model(s) 214. In an example, the word probability analyzer 240 may assign a probability value (e.g., a percentage) indicating the probability of the candidate word corresponding to the handwriting input 102, where candidate word having relatively more matching characteristics is assigned a relatively higher probability value as compared to a candidate word having relatively fewer matching characteristics.

In an example, the third level recognition model(s) 216 also includes a word ranking analyzer 242 configured to rank candidate words 106 based on the probability values determined by the word probability analyzer 240. For example, the word ranking analyzer 242 may rank the candidate words in sequence based on the candidate words with the highest probably value.

In an example, the handwriting application 210 outputs one or more of the candidate words 106 based on the ranking. In an example, the output candidate words 106 may be limited based on a probability threshold, which may be a configurable value depending on if more (relatively lower threshold) or less (relatively higher threshold) candidate words are desired. In some use cases, there may only be space on the display for a maximum number of candidate words, or a limited number may be desired for improved processing efficiency or an improved user experience. In other cases, a larger number of candidate words may be accommodated on the display or the user or implementer of the system may desire more options from which to select. Thus, for example, the handwriting application 210 may output (e.g., displayed on display 112) the top ranked candidate words having a probability value greater than a probability threshold.

In a non-limiting additional or alternative example, the handwriting application 210 also includes a word filter 218 configured to filter candidate words based on results of one or more of the first level recognition model(s) 212, the second level recognition model(s) 214, or the third level recognition model(s) 216. For instance, the word filter 218 may filter one or more word lists or proposed candidate words using the set of characteristics from the first and second level recognition models, and/or based on the probabilities, in order to eliminate words from being considered candidate words. In some cases, for example, the word filter 218 may weigh or consider the results of different analyzers differently, for example, by giving a higher weight or consideration to higher likelihood results as compared to lower likelihood results. In other words, the system forces the one or more candidate words 106 to include the relatively more recognizable letters or characteristics or sequences of the handwriting input 102, while allowing more flexibility for including candidate words that have less certain matches with the relatively less recognizable letters or characteristics or sequences of the handwriting input 102. In the example of FIGS. 1 and 2, for instance, since the handwriting input 102 may be determined to begin with a capital "R" with a relatively high likelihood and to have a N-gram sequence with a descender at the end, but where some letters in the middle are more questionable, the word filter 218 eliminate potential candidate words that do not begin with a capital "R" or end with a N-gram sequence having a descender characteristic.

Additionally, although the example of FIG. 2 has been explained with reference to the first level recognition model(s) 212, the second level recognition model(s) 214, the third level recognition model(s) 216, and the word filter 218, it should be understood that other numbers of levels or combinations of levels, analyzers, or word filters may be used, or used in different orders, to achieve similar results as described herein.

Figure 3:
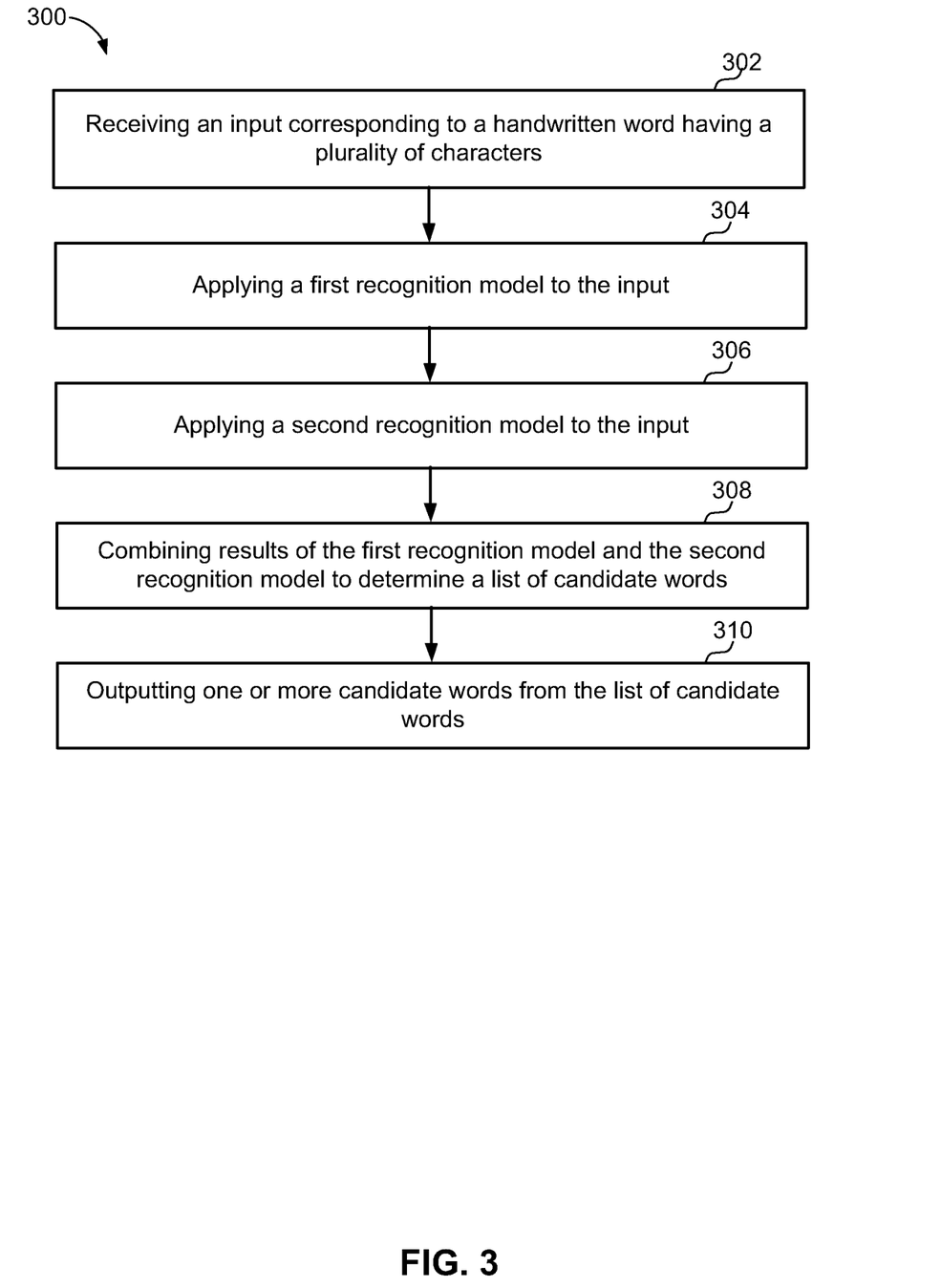
FIG. 3 is a flowchart of an example method of handwriting recognition performed by the computing device of FIG. 1, according to aspects of the present disclosure.

Referring now to FIG. 3, an example method 300 for handwriting recognition is disclosed. In an example, operations of the method 300 may be performed by the computing device 110, including one or more components (e.g., components of FIGS. 1, 2, and/or 4) of the computing device 110, based on the display 112 receiving the handwriting input 102 (e.g., digital ink), such as from the digital pen 150. While examples described herein are based on the handwriting input 102 being received based on digital ink formed by the digital pen 150, as described herein, other forms of input, such as finger input or a scanned documents, may use the same operations of the method 300.

At 302, the example method 300 includes receiving an input corresponding to a handwritten word having a plurality of characters. For example, one or more of a processor 48, a user interface 56 (including display 112), an operating system 140, handwriting recognition module 104, or an application 160 (including handwriting application 210) may receive the handwriting input 102 corresponding to a handwritten word (e.g., "Reasoning") based on the display 112 detecting interaction from the digital pent 150, as described in detail above.

At 304, the example method 300 also includes applying a first recognition model to the input. For example, one or more of the processor 48, the operating system 140, handwriting recognition module 104, or the application 160 (including handwriting application 210) may apply the first level recognition model(s) 212 to the handwriting input 102, as described above in detail. In an example, the first level recognition model(s) 212 may be configured to determine a first confidence level of a first portion 276 of the handwriting input 102 is greater than a second confidence level of a second portion 278 of the handwriting input 102. In an example, the first confidence level and the second confidence level may indicate the likelihood of the first portion 276 and the second portion 278 including recognizable characters. In an example, the first level recognition model(s) 212 may include a plurality of analyses configured to determine the confidence levels of the handwriting input 102.

In an example, the example method 300 may also include identifying a positional relationship of the first portion of the input to the second portion of the input, wherein one or both of the first confidence level or the second confidence level is determined based on the positional relationship. For example, one or more of the processor 48, the operating system 140, handwriting recognition module 104, or the application 160 (including handwriting application 210) may identify a positional relationship of the first portion 276 to the second portion 278 which may indicate the first portion 276 is written at an initial portion of the handwriting input 102 and the second portion 278 is written at an end portion of the handwriting input 102, as described in detail above. Based on the positional relationship, one or both of the first confidence level or the second confidence level may be determined.

In another example, the example method 300 may also include identifying at least one of an ascending characteristic or a descending characteristic of one or both of the first portion of the input or the second portion of the input. For example, one or more of the processor 48, the operating system 140, handwriting recognition module 104, or the application 160 (including handwriting application 210) may identify at least one of an ascending characteristic or a descending characteristic of one or both of the first portion 276 or the second portion 278. As described herein the ascending and descending characteristics may be determined based portions of the handwriting input 102 ascending above the baseline 252 or descending below the marker 245. In an example, one or both of the first confidence level or the second confidence level may be determined based on one or both of the ascending characteristics or the descending characteristics.

In another example, the example method 300 may also include identifying a width of the second portion of the input to be greater than a known width of at least one character of a plurality of known characters having known character widths. For example, one or more of the processor 48, the operating system 140, handwriting recognition module 104, or the application 160 (including handwriting application 210) may identify a width of the second portion 174 being greater than a known width of at least one character of a plurality of known characters having known character widths from the language model information 204, as described in detail above. For instance, the length of the second portion 174 may indicate that the second portion 174 is an N-gram sequence. Further, one or both of the first confidence level or the second confidence level may be determined by one or more of the processor 48, the operating system 140, or the application 160 (including handwriting application 210) based on the width of the second portion 174 being greater than the width of the at least one character of the plurality of known characters.

In another example, the example method 300 may also include identifying an estimated number of characters of the input. For example, one or more of the processor 48, the operating system 140, handwriting recognition module 104, or the application 160 (including handwriting application 210) may identify an estimated number of characters of the handwriting input 102, as described in detail above. For example, the estimated number of characters may be determined based on a number of cut points (e.g., cut points 263, 265, 267, 269, and/or 271). In an example, one or both of the first confidence level or the second confidence level may be determined based on the estimated number of characters of the handwriting input 102.

At 306, the example method 300 also includes applying a second recognition model to the input. For example, one or more of the processor 48, the operating system 140, handwriting recognition module 104, or the application 160 (including handwriting application 210) may apply the second level recognition model(s) 214 to the handwriting input 102. As described herein, the second level recognition model(s) 214 may be different from the first level recognition model(s) 212. For example, the second level recognition model(s) 214 may include a plurality of recognizers to determine N-gram sequences, unknown characters, or individual characters of the handwriting input 102.

At 308, the example method 300 also includes combining, by the processor, results of the first recognition model and the second recognition model to determine a list of candidate words. For example, one or more of the processor 48, the operating system 140, handwriting recognition module 104, or the application 160 (including handwriting application 210) may combine results of the first level recognition model(s) 212 and the second level recognition model(s) 214 to determine a list of candidate words, as described in detail above. In an example, the combining may be performed through heuristics and/or a neural network to combine the results.

In an example, the example method 300 may also include determining a probability of the one or more candidate words to correspond to the input based on the combined results. For example, one or more of the processor 48, the operating system 140, handwriting recognition module 104, or the application 160 (including handwriting application 210) may determine a probability of the one or more candidate words to correspond to the handwriting input 102 based on the combined results. In an example, a probability value, indicating the probability of the candidate word corresponding to the handwriting input 102, may be assigned to each of the candidate words.

In an example, the example method 300 may also include ranking the one or more candidate words based on the probability values. For example, one or more of the processor 48, the operating system 140, handwriting recognition module 104, or the application 160 (including handwriting application 210) may rank the candidate words in sequence based on the candidate words with the highest probability value.

At 310, the example method 300 also includes outputting, by the processor, one or more candidate words from the list of candidate words. For example, one or more of the processor 48, the user interface 56 (including display 112), the operating system 140, handwriting recognition module 104, or the application 160 (including handwriting application 210) may output one or more candidate words from the list of candidate words. In an example, the one or more candidate words 106 may be displayed on the display 112 or provided to a different device (e.g., printer, second display device) for outputting the one or more candidate words 106. In an example, the one or more candidate words 106 may be output, e.g., presented on a display and/or stored in a memory, based on one or more of the probability value and/or the ranking.

Figure 4:
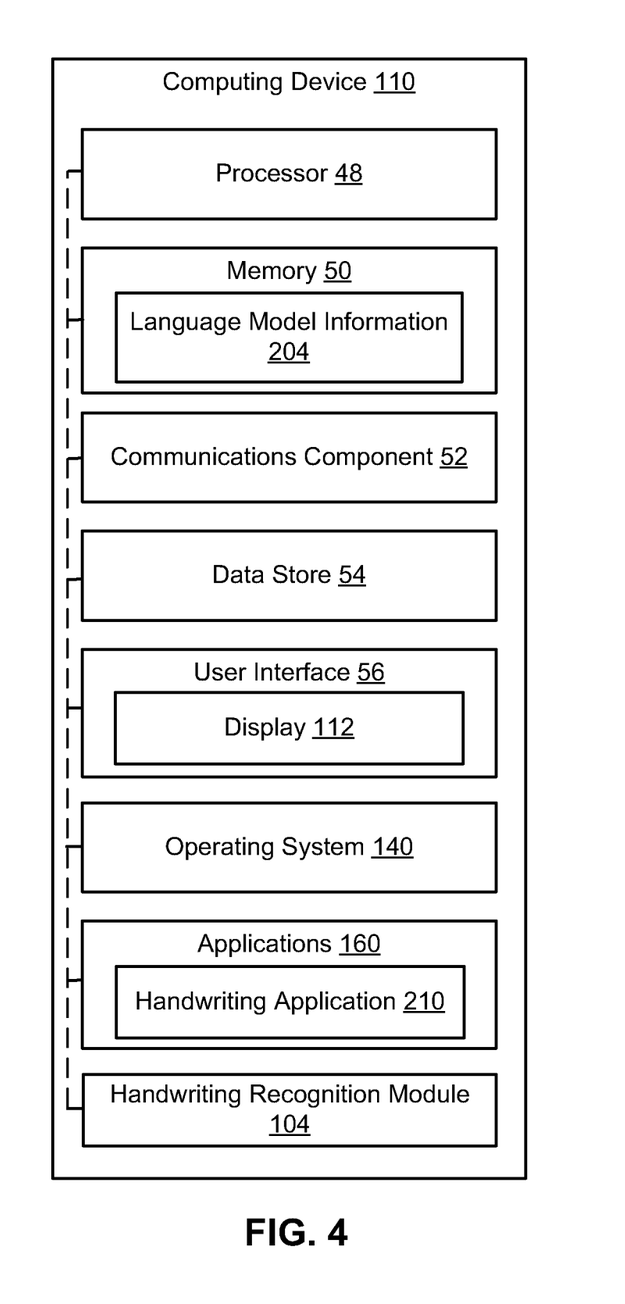
FIG. 4 is a schematic block diagram of example components of the computing device of FIG. 1, according to aspects of the present disclosure.

Referring now to FIG. 4, an example computing device 110 in accordance with an implementation includes additional component details as compared to FIG. 2. In one example, the example computing device 110 includes the processor 48 for carrying out processing functions associated with one or more of components and functions described herein. The processor 48 can include a single or multiple set of processors or multi-core processors. Moreover, the processor 48 may be implemented as an integrated processing system and/or a distributed processing system. In an example, the processor 48 may include, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 48 may include other processing components such as one or more arithmetic logic units (ALUs), registers, or control units.

In an example, the example computing device 110 also includes a memory 50 for storing instructions executable by the processor 48 for carrying out the functions described herein. The memory 50 may be configured for storing data and/or computer-executable instructions defining and/or associated with the operating system 140 and/or handwriting recognition module 104 and/or one or more applications 160, and the processor 48 may execute the operating system 140 and/or handwriting recognition module 104 and/or the one or more applications 160. An example of memory 50 may include, but is not limited to, a type of memory usable by a computer, such as random access memory (RAM), read only memory (ROM), tapes, magnetic discs, optical discs, volatile memory, non-volatile memory, and any combination thereof. In an example, the memory 50 may store local versions of applications being executed by processor 48. In an example, the memory 50 may store the language model information 204.

The example computing device 110 also includes a communications component 52 that provides for establishing and maintaining communications with one or more parties utilizing hardware, software, and services as described herein. The communications component 52 may carry communications between components on the computing device 110, as well as between the computing device 110 and external devices, such as devices located across a communications network and/or devices serially or locally connected to the computing device 110. For example, the communications component 52 may include one or more buses, and may further include transmit chain components and receive chain components associated with a transmitter and receiver, respectively, operable for interfacing with external devices. In an implementation, for example, the communications component 52 may include connection 124 for communicatively connecting the digital pen 150 to the processor 48.

The example computing device 110 also includes a data store 54, which may be any suitable combination of hardware and/or software, that provides for mass storage of information, databases, and programs employed in connection with implementations described herein. For example, the data store 54 may be a data repository for the operating system 140 and/or handwriting recognition module 104 and/or the applications 160.

The example computing device 110 also includes a user interface component 56 operable to receive inputs from a user of the computing device 110 and further operable to generate outputs for presentation to the user. The user interface component 56 may include one or more input devices, including but not limited to a keyboard, a number pad, a mouse, a touch-sensitive display (e.g., display 112), a digitizer, a navigation key, a function key, a microphone, a voice recognition component, any other mechanism capable of receiving an input from a user, or any combination thereof. Further, the user interface component 56 may include one or more output devices, including but not limited to a display (e.g., display 112), a speaker, a haptic feedback mechanism, a printer, any other mechanism capable of presenting an output to a user, or any combination thereof.

In an implementation, the user interface component 56 may transmit and/or receive messages corresponding to the operation of the operating system 140 and/or the applications 160. In addition, the processor 48 executes the operating system 140 and/or the applications 160, and the memory 50 or the data store 54 may store them.

FURTHER EXAMPLES AND IMPLEMENTATIONS

An example method of handwriting recognition, comprising: receiving, by a processor, an input corresponding to a handwritten word having a plurality of characters; applying, by the processor, a first recognition model to the input, the first recognition model configured to determine a first confidence level of a first portion of the input is greater than a second confidence level of a second portion of the input, the first confidence level and the second confidence level indicating a likelihood of the first portion of the input and the second portion of the input including recognizable characters; applying, by the processor, a second recognition model to the input, wherein the second recognition model is different from the first recognition model; combining, by the processor, results of the first recognition model and the second recognition model to determine a list of candidate words; and outputting, by the processor, one or more candidate words from the list of candidate words.

The example method above, wherein the combining the results of the first recognition model and the second recognition model further comprises: filtering the list of candidate words by removing the results of the first recognition model and the second recognition model that do not include a first set of one or more potential characters at a corresponding one or more first estimated character positions of the input, to define a filtered list of candidate words; and selecting the one or more candidate words from the filtered list of candidate words.

One or more of the example methods above, wherein the applying the first recognition model comprises: identifying a positional relationship of the first portion of the input to the second portion of the input, wherein one or both of the first confidence level or the second confidence level is determined based on the positional relationship.

One or more of the example methods above, wherein the applying the first recognition model comprises: identifying at least one of an ascending characteristic or a descending characteristic of one or both of the first portion of the input or the second portion of the input, wherein a corresponding one or both of the first confidence level or the second confidence level is determined based on one or both of the ascending characteristic or the descending characteristic.

One or more of the example methods above, wherein the applying the first recognition model comprises: identifying a width of the second portion of the input to be greater than a known width of at least one character of a plurality of known characters having known character widths, wherein one or both of the first confidence level or the second confidence level is determined based on the width of the second portion of the input being greater than the width of the at least one character of the plurality of known characters.

One or more of the example methods above, wherein the applying the first recognition model comprises: identifying an estimated number of characters of the input, wherein one or both of the first confidence level or the second confidence level is determined based on the estimated number of characters of the input.

One or more of the example methods above, wherein the applying the second recognition model comprises: applying an N-gram sequence recognizer to the input, wherein N is an integer greater than 1.

One or more of the example methods above, wherein the applying the second recognition model comprises: applying an individual character recognizer to the input.

One or more of the example methods above, wherein the first recognition model comprises a plurality of analyses to determine the first confidence level and the second confidence level, the plurality of analyses including two or more of character number analysis, a capital letter analysis, a positional relationship analysis, or a segment width analysis, and wherein the second recognition model comprises a plurality of recognizers to determine characters of the input, the plurality of recognizers including two or more of an individual character recognizer, an unknown character recognizer, or an N-gram sequence recognizer.

One or more of the example methods above, further comprising: receiving a first user input defining the input corresponding to the handwritten word; displaying, on a display, the one or more candidate words; receiving a second user input identifying a selected word from the one or more candidate words being displayed; and display the selected word in response to the receiving the second user input.

One or more of the example methods above, wherein the input is a digital ink input.

One or more of the example methods above, further comprising: determining a probability of the one or more candidate words to correspond to the input based on the results.

An example computer-readable medium storing instructions for performing operations of any of the example methods above.

An example computing device for handwriting recognition, comprising: a memory storing instructions; a processor communicatively coupled with the memory and configured to: receive an input corresponding to a handwritten word having a plurality of characters; apply a first recognition model to the input, the first recognition model configured to determine a first confidence level of a first portion of the input is greater than a second confidence level of a second portion of the input, the first confidence level and the second confidence level indicating a likelihood of the first portion of the input and the second portion of the input including recognizable characters; apply a second recognition model to the input, wherein the second recognition model is different from the first recognition model; combine results of the first recognition model and the second recognition model to determine a list of candidate words; and output one or more candidate words from the list of candidate words.

The example computing device above, wherein to combine the results of the first recognition model and the second recognition model the processor is further configured to: filter the list of candidate words by removing the results of the first recognition model and the second recognition model that do not include a first set of one or more potential characters at a corresponding one or more first estimated character positions of the input, to define a filtered list of candidate words; and selecting the one or more candidate words from the filtered list of candidate words.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of handwriting recognition, comprising:
    receiving, by a processor, an input corresponding to a handwritten word having a plurality of characters;
    applying, by the processor, a first recognition model to the input handwritten word, the first recognition model configured to determine a first confidence level of a first portion of the input handwritten word and a second confidence level of a second portion of the input handwritten word, the first confidence level and the second confidence level indicating a likelihood of the first portion of the input handwritten word and the second portion of the input handwritten word including recognizable characters, wherein the first recognition model does not attempt to identify characters but identifies characteristics of the input handwritten word for potential characters;
    applying, by the processor, a second recognition model to the input handwritten word, wherein the second recognition model is different from the first recognition model, is selected based on the confidence levels determined by the first recognition model, and is configured to determine characters of the input handwritten word based on the characteristics identified by the first recognition model and one or more words that include such characters;
    applying, by the processor, a third recognition model configured to determine a list of candidate words based on the characteristics determined by the first recognition model and the words determined by the second recognition model; and
    outputting by the processor one or more candidate words for the input handwritten word from the list of candidate words.

2. The method of claim 1, further comprising:
    filtering the list of candidate words using the characteristics from the first recognition model and the second recognition model, to define a filtered list of candidate words; and
    selecting the one or more candidate words from the filtered list of candidate words.

3. The method of claim 1, wherein the applying the first recognition model comprises:
    identifying a positional relationship of the first portion of the input handwritten word to the second portion of the input handwritten word, wherein one or both of the first confidence level or the second confidence level is determined based on the positional relationship.

4. The method of claim 1, wherein the applying the first recognition model comprises:
    identifying at least one of an ascending characteristic or a descending characteristic of one or both of the first portion of the input handwritten word or the second portion of the input handwritten word, wherein a corresponding one or both of the first confidence level or the second confidence level is determined based on one or both of the ascending characteristic or the descending characteristic.

5. The method of claim 1, wherein the applying the first recognition model comprises:
    identifying a width of the second portion of the input handwritten word to be greater than a known width of at least one character of a plurality of known characters having known character widths, wherein one or both of the first confidence level or the second confidence level is determined based on the width of the second portion of the input handwritten word being greater than the width of the at least one character of the plurality of known characters.

6. The method of claim 1, wherein the applying the first recognition model comprises:
    identifying an estimated number of characters of the input handwritten word by determining cut points between characteristics of the input handwritten word, wherein one or both of the first confidence level or the second confidence level is determined based on the estimated number of characters of the input handwritten word.

7. The method of claim 1, wherein the applying the second recognition model comprises:
    applying an N-gram sequence recognizer to the input handwritten word, wherein N is an integer greater than 1.

8. The method of claim 1, wherein the applying the second recognition model comprises:
    applying an individual character recognizer to the input handwritten word.

9. The method of claim 1,
    wherein the first recognition model comprises a plurality of analyses to determine the first confidence level and the second confidence level, the plurality of analyses including two or more of character number analysis, a capital letter analysis, a positional relationship analysis, or a segment width analysis, and
    wherein the second recognition model comprises a plurality of recognizers to determine characters of the input handwritten word, the plurality of recognizers including two or more of an individual character recognizer, an unknown character recognizer, or an N-gram sequence recognizer.

10. The method of claim 1, further comprising:
    receiving a first user input defining the input corresponding to the handwritten word;
    displaying, on a display, the one or more candidate words;
    receiving a second user input identifying a selected word from the one or more candidate words being displayed; and
    displaying the selected word in response to the receiving the second user input.

11. The method of claim 1, wherein the input is a digital ink input.

12. The method of claim 1, further comprising:
determining a probability of the one or more candidate words to correspond to the input handwritten word based on the results.

13. A computing device for handwriting recognition, comprising:
a memory storing instructions;
a processor communicatively coupled with the memory and configured to:
receive an input corresponding to a handwritten word having a plurality of characters;
apply a first recognition model to the input handwritten word, the first recognition model configured to determine a first confidence level of a first portion of the input handwritten word and a second confidence level of a second portion of the input handwritten word, the first confidence level and the second confidence level indicating a likelihood of the first portion of the input handwritten word and the second portion of the input handwritten word including recognizable characters, wherein the first recognition model does not attempt to identify characters but identifies characteristics of the input handwritten word for potential characters;
apply a second recognition model to the input handwritten word, wherein the second recognition model is different from the first recognition model, is selected based on the confidence levels determined by the first recognition model and is configured to determine characters of the input handwritten word based on the characteristics identified by the first recognition model and one or more words that include such characters;
apply a third recognition model, wherein the third recognition model is configured to determine a list of candidate words based on the characteristics determined by the first recognition model and the words determined by the second recognition model; and
output one or more candidate words for the input handwritten word from the list of candidate words.

14. The computing device of claim 13, wherein the processor is further configured to:
filter the list of candidate words using the characteristics from the first recognition model and the second recognition model, to define a filtered list of candidate words; and
select the one or more candidate words from the filtered list of candidate words.

15. A non-transitory computer-readable medium storing instructions for performing a method comprising:
receiving an input corresponding to a handwritten word having a plurality of characters;
applying a first recognition model to the input handwritten word, the first recognition model configured to determine a first confidence level of a first portion of the input handwritten word and a second confidence level of a second portion of the input handwritten word, the first confidence level and the second confidence level indicating a likelihood of the first portion of the input handwritten word and the second portion of the input handwritten word including recognizable characters, wherein the first recognition model does not attempt to identify characters but identifies characteristics of the input handwritten word for potential characters;
applying a second recognition model to the input handwritten word, wherein the second recognition model is different from the first recognition model, is selected based on the confidence levels determined by the first recognition model, and is configured to determine characters of the input handwritten word based on the characteristics identified by the first recognition model and one or more words that include such characters;
applying a third recognition model configured to determine a list of candidate words based on the characteristics determined by the first recognition model and the words determined by the second recognition model; and
outputting one or more candidate words for the input handwritten word from the list of candidate words.

16. The computer-readable medium of claim 15, wherein the method further comprises:
filtering the list of candidate words using the characteristics from the first recognition model and the second recognition model, to define a filtered list of candidate words; and
selecting the one or more candidate words from the filtered list of candidate words.

17. The computer-readable medium of claim 15, wherein the applying the first recognition model comprises:
identifying a positional relationship of the first portion of the input handwritten word to the second portion of the input handwritten word, wherein one or both of the first confidence level or the second confidence level is determined based on the positional relationship.

18. The computer-readable medium of claim 15, wherein the applying the first recognition model comprises:
identifying at least one of an ascending characteristic or a descending characteristic of one or both of the first portion of the input handwritten word or the second portion of the input handwritten word, wherein a corresponding one or both of the first confidence level or the second confidence level is determined based on one or both of the ascending characteristic or the descending characteristic.

19. The computer-readable medium of claim 15, wherein the applying the first recognition model comprises:
identifying a width of the second portion of the input handwritten word to be greater than a known width of at least one character of a plurality of known characters having known character widths, wherein one or both of the first confidence level or the second confidence level is determined based on the width of the second portion of the input handwritten word being greater than the width of the at least one character of the plurality of known characters.

20. The computer-readable medium of claim 15, wherein the applying the second recognition model comprises:
applying an N-gram sequence recognizer to the input handwritten word, wherein N is an integer greater than 1.

* * * * *